United States Patent
Shi et al.

(10) Patent No.: US 10,819,838 B2
(45) Date of Patent: Oct. 27, 2020

(54) TERMINAL DEVICE AND CONTROL METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jia Shi, Beijing (CN); Runfei Du, Beijing (CN); Cuie Wang, Beijing (CN); Gaowei Chen, Beijing (CN); Desheng Xiang, Beijing (CN); Zongli Gao, Beijing (CN); Xinda Li, Beijing (CN); Shuainan Liu, Beijing (CN); Zhengxuan Lv, Beijing (CN); Lidong Wang, Beijing (CN); Jiaqiang Wang, Beijing (CN); Yafeng Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/665,840

(22) Filed: Oct. 28, 2019

(65) Prior Publication Data
US 2020/0296199 A1 Sep. 17, 2020

(30) Foreign Application Priority Data
Mar. 11, 2019 (CN) .......................... 2019 1 0179895

(51) Int. Cl.
*H04M 1/667* (2006.01)
*H04M 1/725* (2006.01)
(Continued)

(52) U.S. Cl.
CPC ............ *H04M 1/667* (2013.01); *G08B 25/08* (2013.01); *H04M 1/23* (2013.01); *H04M 1/725* (2013.01); *G06F 2203/04105* (2013.01)

(58) Field of Classification Search
CPC .................................................... H04M 1/667
(Continued)

(56) References Cited

U.S. PATENT DOCUMENTS

2004/0172180 A1* 9/2004 Bowman ............. B60C 23/0433
701/31.4
2017/0024587 A1 1/2017 Nonogaki et al.

FOREIGN PATENT DOCUMENTS

CN 103475777 A 12/2013
CN 104811510 A 7/2015
CN 108447433 A 8/2018

OTHER PUBLICATIONS

Office Action, including Search Report, for Chinese Patent Application No. 201910179895.2, dated May 28, 2020, 14 pages.

\* cited by examiner

*Primary Examiner* — Joel Ajayi
(74) *Attorney, Agent, or Firm* — Westman, Champlin & Koehler, P.A.

(57) ABSTRACT

A terminal device and a method for controlling the terminal device are provided. The terminal device includes a terminal body; a pressure sensor arranged at a side of the terminal body; a control circuit, connected with an output terminal of the pressure sensor, and configured to perform a preset operation when a pressure detected by the pressure sensor is not smaller than a preset pressure threshold.

17 Claims, 4 Drawing Sheets

(51) Int. Cl.
*G08B 25/08* (2006.01)
*H04M 1/23* (2006.01)

(58) Field of Classification Search
USPC .............................................. 455/411, 550.1
See application file for complete search history.

TERMINAL DEVICE AND CONTROL METHOD THEREOF

CROSS-REFERENCE TO RELATED APPLICATION

This application claims a priority to Chinese Patent Application No. 201910179895.2 filed in China on Mar. 11, 2019, the disclosure of which is incorporated herein in its entirety by reference.

TECHNICAL FIELD

The present disclosure relates to communication technologies, in particular to a terminal device and a control method thereof.

BACKGROUND

With popularity of mobile phones and other terminal devices, these terminal devices are more closely related to people's lives. However, when the mobile phones are in use in the related art, in order to avoid being touched mistakenly when the mobile phones are carried, it is usually necessary to unlock the mobile phones before calling various functions. In some cases, for example, when an emergency alarm is needed, the user needs to perform multiple operations to realize the emergency alarm, which is inconvenient.

SUMMARY

In a first aspect, the embodiments of the present disclosure provide a terminal device, including:
a terminal body;
a pressure sensor arranged at a side of the terminal body;
a control circuit, connected with an output terminal of the pressure sensor, and configured to perform a preset operation when a pressure detected by the pressure sensor is not smaller than a preset pressure threshold.

Optionally, at least two pressure sensors are provided, and at least one pressure sensor is arranged at each one of two sides of the terminal body which are opposed to each other.

Optionally, the control circuit is configured to perform the preset operation when the pressure detected by at least one pressure sensor arranged at each one of the two sides of the terminal body which are opposed to each other is not smaller than the preset pressure threshold.

Optionally, the pressure sensor includes four strain gauges, which are connected with each other end to end to form a bridge, a connecting terminal formed between any two of the connected strain gauges, the bridge includes a first connecting terminal, a second connecting terminal, a third connecting terminal and a fourth connecting terminal, the first connection terminal and the third connection terminal are connected with two terminals of an excitation power supply respectively, the second connection terminal and the fourth connection terminal are connected with two output terminals of the pressure sensor respectively.

Optionally, the pressure sensor includes a substrate and four strain patterns arranged on the substrate, each of the strain patterns forms the strain gauge.

Optionally, the terminal device further includes a communication circuit connected with the control circuit, wherein the preset operation includes controlling the communication circuit to send an alarm signal, and sending the alarm signal includes dialing an alarm number and/or sending an alarm message.

Optionally, the terminal device further includes a feedback circuit connected with the communication circuit and the control circuit, wherein the feedback circuit is configured to control the communication circuit to send the alarm signal continuously when the alarm signal is sent and no input of interrupting the alarm signal is detected.

Optionally, the terminal device further includes a vibration circuit for sending a vibration prompt signal after the communication circuit sending the alarm signal.

Optionally, the terminal device further includes a signal amplification circuit, wherein an input terminal of the signal amplification circuit is connected with an output terminal of the pressure sensor, and an output terminal of the signal amplification circuit is connected with an input terminal of the control circuit.

Optionally, the terminal device further includes a housing, wherein a hole through the housing is provided at a side of the housing, and the pressure sensor is accommodated in the hole.

In a second aspect, the embodiments of the present disclosure provide a method for controlling a terminal device, applied to any one of the terminal device, including:
performing, the preset operation when the pressure detected by the pressure sensor is not smaller than the preset pressure threshold.

Optionally, at least two pressure sensors are provided, and at least one pressure sensor is arranged at each one of two sides of the terminal body which are opposed to each other, performing the preset operation when a pressure detected by the pressure sensor is not smaller than the preset pressure threshold, includes:
performing, the preset operation when the pressure detected by at least one pressure sensor arranged at each one of the two sides of the terminal body which are opposed to each other is not smaller than the preset pressure threshold.

Optionally, performing the preset operation includes unlocking a screen of a mobile phone, starting an application or sending an alarm signal.

Optionally, the terminal device includes a communication circuit connected with the control circuit, performing the preset operation, includes:
controlling, by the control circuit, the communication circuit to send the alarm signal, and sending the alarm signal is to dial an alarm number and/or send an alarm message.

Optionally, after controlling, by the control circuit, the communication circuit to send the alarm signal, the method further includes:
sending a vibration prompt signal.

Optionally, the alarm message includes at least user information and/or current position information of the terminal device.

Optionally, the terminal device further includes a feedback circuit connected with the communication circuit and the control circuit, after controlling, by the control circuit, the communication circuit to send the alarm signal,
the method further includes:
controlling, by the feedback circuit, the communication circuit to send the alarm signal continuously when the alarm signal is sent and no input of interrupting the alarm signal is detected.

Optionally, the preset pressure threshold includes at least a first pressure threshold and a second pressure threshold, the first pressure threshold is smaller than the second pressure threshold, the preset operation includes at least a first preset operation and a second preset operation, and the first preset operation and the second preset operation are different operations, performing, the preset operation when the pressure detected by the pressure sensor is not smaller than the preset pressure threshold, includes:

performing, the first preset operation when the pressure detected by the pressure sensor is not smaller than the first pressure threshold and not larger than the second pressure threshold;

performing, the second preset operation when the pressure detected by the pressure sensor is not smaller than the second pressure threshold.

In a third aspect, the embodiments of the present disclosure provide a terminal device, including: a memory, a processor, and a computer program stored in the memory and capable of being executed by the processor, the processor is configured to execute the computer program, to perform any one of the methods for controlling the terminal device described above.

In a fourth aspect, the embodiments of the present disclosure provide a computer readable medium on which is stored computer program to be executed by a processor, to perform any one of the methods for controlling the terminal device described above.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION

The technical solutions in the embodiments of the present disclosure will be described hereinafter clearly and completely with reference to the drawings of the embodiments of the present disclosure. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Some embodiments of the present disclosure provide a terminal device.

Figure 1:
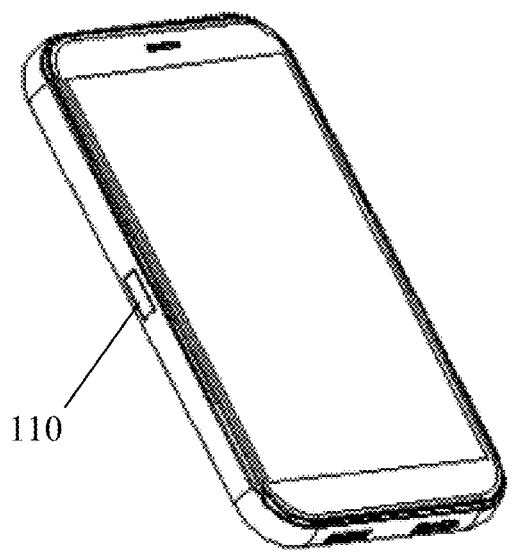
FIG. 1 is a schematic diagram illustrating a structure of a terminal device according to some embodiments of the present disclosure.

As shown in FIG. 1, in one embodiment, the terminal device includes a terminal body and a pressure sensor 110 arranged at a side of the terminal body.

The terminal device also includes a control circuit 620 (referring to FIG. 6) connected with the pressure sensor 110, and the control circuit 620 is configured to perform a preset operation when a pressure detected by the pressure sensor is not smaller than a preset pressure threshold.

The terminal device may include, but is not limited to, a mobile phones, a tablet, an e-book reader, a MP3 player, a MP4 player, a digital camera, a laptop portable computer, a wearable device, a remote controller and other terminal devices.

The preset operation performed by the control circuit 620 may be either an operation set by the terminal device or an operation set according to a user's input. When the pressure sensor 110 detects the pressure, a corresponding pressure signal is generated and sent to the control circuit 620. After receiving the pressure signal sent by the pressure sensor 110, the control circuit 620 performs the preset operation.

The control circuit 620 may include a microprocessor, a control chip, or a control circuit.

When the control circuit 620 includes the microprocessor, an output terminal of the pressure sensor 110 is connected with the microprocessor. After detecting the pressure signal from the pressure sensor 110, the microprocessor generates a control signal corresponding to the preset operation and controls the terminal device to perform the corresponding operation.

When the control circuit 620 includes the control chip or the control circuit, a trigger level of the control chip or control circuit may be set according to the preset pressure threshold.

For example, the control chip or the control circuit is configured to be triggered and perform the preset operation at the trigger level, and the trigger level is a high level, so the control chip or the control circuit cannot be triggered at a low level. When the pressure detected by the pressure sensor 110 is smaller than the preset pressure threshold, a level of the pressure signal does not reach the trigger level; when the pressure detected by the pressure sensor 110 is not smaller than the preset pressure threshold, the level of the pressure signal is larger than or equal to the trigger level, which can trigger the control chip or the control circuit to perform the preset operation when the pressure detected by the pressure sensor 110 is larger than the preset pressure threshold.

Taking that the terminal device is a mobile phone as an example, the preset operation may include, but is not limited to, unlocking a screen of the mobile phone, starting an application, dialing a number, sending a short message, etc. An example of dialing the number in this embodiment is illustrated. In the case that the pressure detected by the pressure sensor 110 is larger than the preset pressure threshold, the mobile phone directly dials the number when the screen of the mobile phone is turned off or turned on.

A corresponding preset operation may be set pertinently according to specific type of the terminal device, and the preset operation may be directly performed by controlling the pressure sensor 110, thus simplifying a control process.

The preset pressure threshold may be set according to practical situation. Generally, the preset pressure threshold may be set according to a pressure generated by a regular operation. For example, for the mobile phone, the tablet and other terminal devices, the preset pressure threshold may be set according to a pressure generated by an ordinary user when holding the terminal device. Obviously, in some specific cases, a specific range of the preset pressure threshold may be adjusted according to each terminal device.

By using the pressure sensor 110 and the control circuit 620, when the pressure sensor 110 detects the pressure, under the circumstance that the corresponding preset operation is already configured, the terminal device of the embodiment may perform the preset operation through the control circuit 620, which simplifies a control and use process and improves a convenience in the use process.

Figure 2:
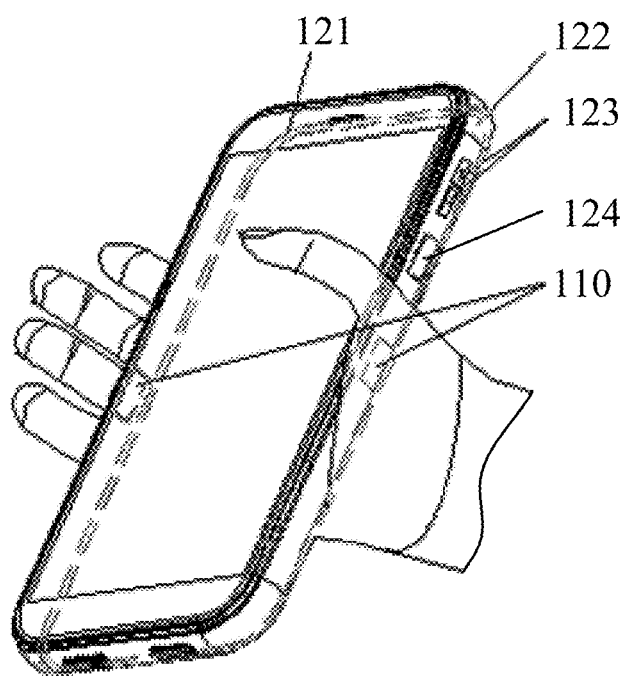
FIG. 2 is a schematic diagram illustrating a structure of a terminal device according to some embodiments of the present disclosure.

Optionally, as shown in FIG. 2, in another specific embodiment, at least two pressure sensors 110 are provided, and each pressure sensor 110 may consists of one or more pressure sensing units. For example, each pressure sensing unit may be a strain gauge or a piezoelectric ceramic. Each pressure sensor 110 may include only one pressure sensing unit; in order to improve an accuracy of detecting the pressure, multiple pressure sensing units may be integrated into one pressure sensor 110.

At least one pressure sensor is arranged at each one of two sides of the terminal body which are opposed to each other. It should be appreciated that, the terminal body has two sides which are opposed to each other, such as a left side and a right side. On each side, one or more pressure sensors 110 are provided.

Taking that the terminal device is the mobile phone as an example, the mobile phone includes a display panel 121, and some buttons are provided on the housing 122 of the mobile phone, such as a volume button 123 and a switch button 124.

The side of the mobile phone refers to a side position of the housing 122, as shown in FIG. 2. At least one pressure sensor 110 is provided at each one of two sides of the mobile phone which are opposed to each other. Then the pressure signal may be detected by any one of the pressure sensors 110, which is more convenient to operate.

In an optional embodiment, the terminal body of the terminal device is provided with at least two pressure sensors 110, and in the case that at least one pressure sensor 110 is arranged at each one of two sides of the terminal body which are opposed to each other, the control circuit 620 is configured to perform the preset operation when the pressure detected by at least one pressure sensor arranged at each one of the two sides of the terminal body which are opposed to each other is not smaller than the preset pressure threshold.

It should be appreciated that, the preset operation is only performed when the pressure sensors 110 on both sides of the terminal body which are opposed to each other detect the pressure at the same time.

It should be appreciated that, when these terminal devices are in use, for example, when the mobile phone is carried in a handbag, the pressure sensor 110 may probably be mistakenly touched. However, compared with the mistakenly touched the pressure sensor 110 on one side, a possibility that both sides of the pressure sensors 110 are mistakenly touched at the same time and the pressures are larger than the preset pressure threshold is very small. Therefore, the pressure detected by the pressure sensor 110 on one side may be due to some factors such as the mistakenly touched, while the pressures detected by the pressure sensors on both sides may be probably caused by the user's operation.

The preset operation can be performed only when the pressure detected by at least one pressure sensor arranged at each one of the two sides of the terminal body which are opposed to each other is not smaller than the preset pressure threshold, which may prevent the preset operation from triggering by being touched mistakenly and improve an accuracy in practical use.

Optionally, the terminal device further includes a communication circuit 640 connected with the control circuit 620, performing the preset operation is to control the communication circuit 640 to send an alarm signal, and sending the alarm signal is to dial an alarm number and/or send an alarm message.

In this embodiment, the terminal device is used for a rapid alarm according to the pressure detected by the pressure sensor 110. When the user needs to alarm in dangerous situations, as long as the pressure sensor 110 is pressed, the alarm may be realized quickly. The alarm process is relatively invisible and the operation is relatively simple, so as to avoid the user from operating the terminal device calmly in emergency situations due to nervous and other factors, or from exposing a behavior of the user when operating the terminal device to alarm.

The dialing the alarm number may be dialing an alarm number where the user is located, then the user talking. Dialing the alarm number may also be playing an audio file after dialing the alarm number. The audio file may include prerecorded user information. The audio file may also include current position information of the terminal device. The current position information may be obtained by calling positioning software or a positioning circuit 630, and played in voice. The positioning software may refer to positioning software in the related art, such as map software. The positioning circuit 630 may be a Beidou positioning circuit, a Global Positioning System (GPS) and so on.

Sending the alarm message may be sending the alarm message to an alarm platform by means of a short message or a communication software. The alarm message may also include the user information and current position information. The current position information may be provided by the positioning software or the positioning circuit 630. More specifically, the alarm message may be provided by text, pictures, etc.

When implementing, the user may choose to dial the alarm number or send the alarm message, or, dial the alarm number and send the alarm message at the same time, which may both realize the rapid alarm.

Optionally, the terminal device further includes a feedback circuit 650 connected with the communication circuit 640 and the control circuit 620, wherein the feedback circuit 650 is configured to control the communication circuit 640 to send the alarm signal continuously when the alarm signal is sent and no input of interrupting the alarm signal is detected.

When the user is in danger and sends the alarm signal, the user's position may change. For example, when the user encounters criminals, after sending the alarm signal through the terminal device, the user escapes from a scene to avoid being hurt, so the position information of the user in the alarm signal sent by the user is not the current position information of the user. In this case, the feedback circuit 650 may continuously send the alarm signal through the communication circuit 640 when the alarm is not stopped. The feedback circuit 650 may directly control the communication circuit 640 to send the alarm signal continuously, and also may control the communication circuit 640 through the control circuit 620 to send the alarm signal continuously.

In a process of sending the alarm signal continuously, the position information of the user may be updated to provide latest information of the user, such as latest position information. Until the user is out of danger, for example, when a police arrives at the scene and can ensure a safety of the user, the alarm signal may be interrupted to stop the alarm.

In this case, as long as the alarm signal is sent through a manual operation for a first time, the alarm signal may be sent continuously, which is convenient for updating a latest status of the user continuously, and no additional control process is needed, thus simplifying the operation.

Optionally, the terminal device further includes a vibration circuit for sending a vibration prompt signal after the communication circuit 640 dialing the alarm number and/or sending the alarm message.

In order to prompt that the alarm is realized successfully, the vibration circuit is further arranged in this embodiment. After the alarm information has been sent successfully, the vibration signal is sent to prompt the user that the alarm is realized successfully. The vibration circuit may be realized by using a vibration motor or using an original vibration motor in the terminal device. Compared with voice, ringtone and other signals, the vibration prompt signal indicating that the alarm is realized successfully is more invisible, which would be better for protecting the safety of the user in some emergency situations.

Meanwhile, if the alarm signal is indeed caused by being touched mistakenly, the vibration signal may also remind the user that the pressure sensor is touched mistakenly, so that the alarm may be timely discarded.

Figure 3:
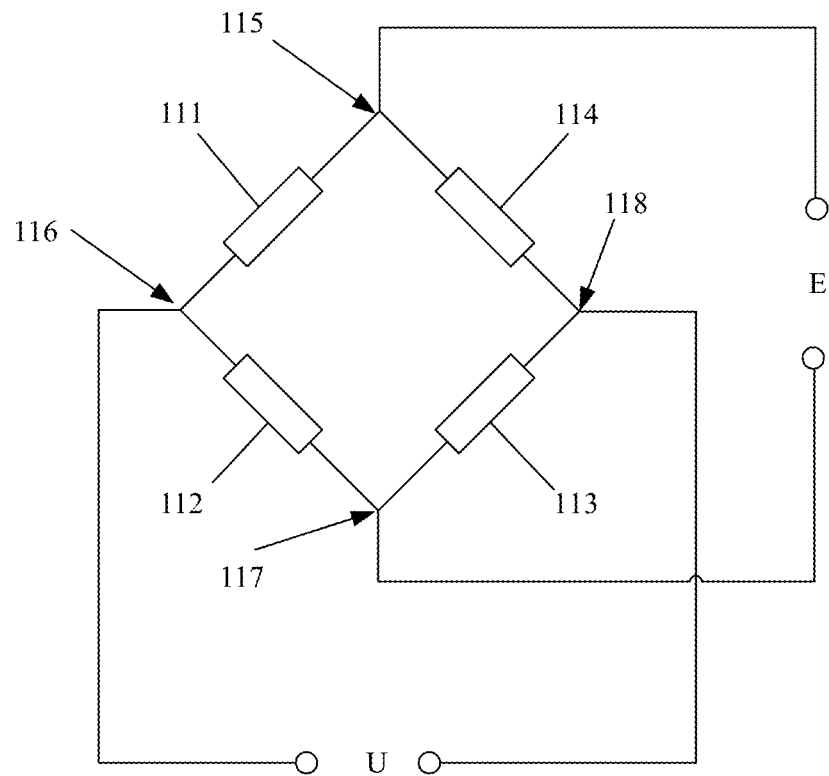
FIG. 3 is a schematic diagram illustrating a circuit of a pressure sensor according to some embodiments of the present disclosure.

In one embodiment, as shown in FIG. 3, the pressure sensor 110 includes four strain gauges, i.e., a first strain gauge 111, a second strain gauge 112, a third strain gauge 113 and a fourth strain gauge 114, which are connected with each other end to end to form a bridge.

In a bridge formed as above, two opposed strain gauges are parallel to each other, while an angle formed between two adjacent strain gauges is larger than 0 degree and smaller than 180 degrees. Generally speaking, for convenience of calculations, directions of two adjacent strain gauges are usually perpendicular to each other.

A connecting terminal is formed between any two of the connected strain gauges, the bridge includes a first connecting terminal 115, a second connecting terminal 116, a third connecting terminal 117 and a fourth connecting terminal 118. The first connection terminal 115 and the third connection terminal 117 are connected with two terminals of an excitation power supply respectively, the excitation power supply is to provide an excitation voltage E. The second connection terminal 116 and the fourth connection terminal 118 are connected with two output terminals of the pressure sensor 110 respectively, the output terminals of the pressure sensor 110 output a pressure signal U. In this way, a Whiston Bridge is formed by four strain gauges.

Four strain gauges may be different strain gauges, but for convenience of calculations, an example that four strain gauges are the same is illustrated in this embodiment, that is, a resistance and a strain sensitivity of each strain gauge are the same when a strain is 0.

Since directions of two opposed strain gauges are the same, strains on the two opposed strain gauges are the same, i.e., resistance variations of the two opposed strain gauges are the same. The resistance variations of two adjacent strain gauges are equal and opposite in sign under a pressure in a particular direction. It should be appreciated that, when a resistance of the first strain gauge 111 and a resistance of the third strain gauge 113 are increased by $\Delta R$ respectively, a resistance of the second strain gauge 112 and a resistance of the fourth strain gauge 114 are decreased by $\Delta R$.

Thus, for the pressure sensor 110, $U=E*\Delta R/R$. U is an output voltage (i.e., the pressure signal) of the pressure sensor 110, E is the excitation voltage input by the excitation power supply and is a fixed value, $\Delta R$ is the resistance variation, R is an original resistance of each strain gauge and is a fixed value.

The higher the pressure on the pressure sensor 110 is, the greater the strain detected by each strain gauge is and the larger the resistance variation $\Delta R$ of each strain gauge is. Since the input voltage E and the original resistance R of the strain gauge are fixed values, the larger the resistance variation $\Delta R$ is, the larger the output voltage U is.

According to the above calculation and analysis, the higher the pressure is, the larger the output voltage U is. Therefore, according to whether the output voltage U of the pressure sensor is larger than a preset voltage threshold, it can be determined whether the pressure detected by the pressure sensor 110 is larger than the preset pressure threshold. When the output voltage U of the pressure sensor is larger than the preset voltage threshold, it is determined that the pressure detected by the pressure sensor is larger than the preset pressure threshold, and when U is smaller than the preset voltage threshold, it is determined that the pressure detected by the pressure sensor is smaller than the preset pressure threshold.

Optionally, the pressure sensor 110 includes a substrate and four strain patterns arranged on the substrate, each of the strain patterns forms a strain gauge.

For fabricating a strain gauge, an elastic substrate is provided first, and then strain patterns are fabricated on the elastic substrate by using sputtering or evaporation. The strain pattern is made of semiconductor or metal. Thus, each strain pattern forms one strain gauge, and then the strain gauges are connected by using conductive structures.

When the substrate is deformed under a force, the strain gauge may deform accordingly and the resistance of the strain gauge may change accordingly, so as to realize the pressure detection.

Optionally, the terminal device further includes a signal amplification circuit 610, wherein an input terminal of the signal amplification circuit 610 is connected with an output terminal of the pressure sensor 110, and an output terminal of the signal amplification circuit 610 is connected with an input terminal of the control circuit 620.

The signal amplification circuit 610 is configured to amplify the output voltage of pressure sensor 110. Generally speaking, the output voltage of the pressure sensor 110 is at a level of millivolt (mV), which may generate a larger measurement error. Therefore, the output voltage of the pressure sensor 110 may be amplified by arranging the signal amplifier circuit 610, and the output voltage of the pressure sensor 110 is compared with the preset voltage threshold after the output voltage of the pressure sensor 110 is amplified to determine whether the pressure detected by the pressure sensor is larger than the preset pressure threshold, which may improve a measurement accuracy.

Figure 4:
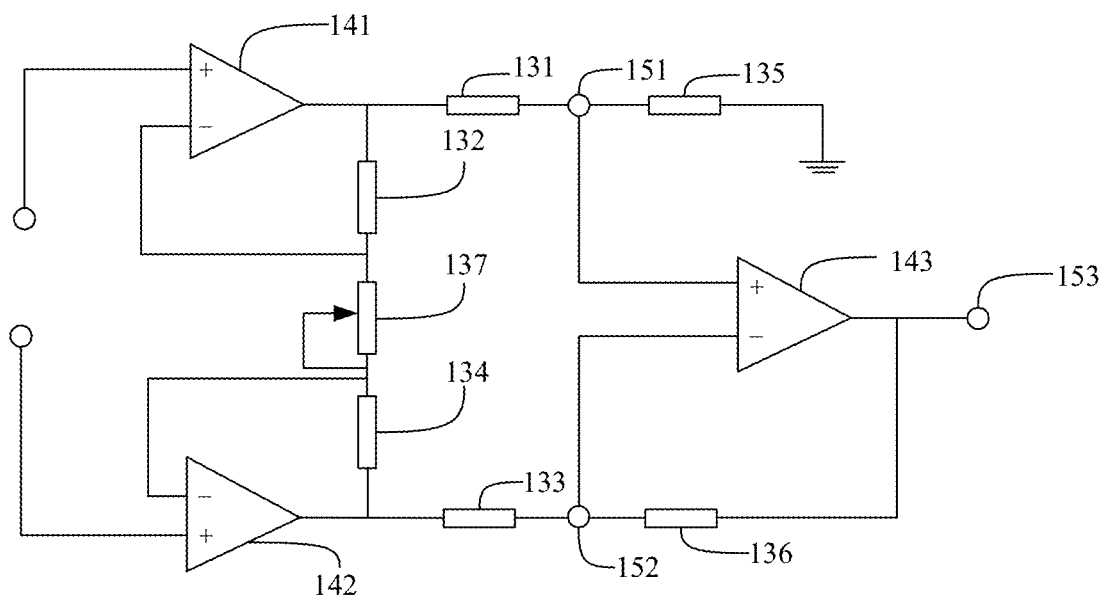
FIG. 4 is a schematic diagram illustrating a signal amplification circuit according to some embodiments of the present disclosure.

In a specific implementation, as shown in FIG. 4, the signal amplification circuit 610 includes a first operational amplifier 141, a second operational amplifier 142, a third operational amplifier 143, a first resistor 131, a second resistor 132, a third resistor 133, a fourth resistor 134, a fifth resistor 135, a sixth resistor 136 and a variable resistor 137.

An input terminal of the signal amplification circuit 610 is connected with a non-inverting input terminal of the first operational amplifier 141 and a non-inverting input terminal of the second operational amplifier 142 respectively.

An output terminal of the first operational amplifier 141 is connected with a first terminal of the first resistor 131 and a first terminal of the second resistor 132, an inverting input terminal of the first operational amplifier 141 is connected with a second terminal of the second resistor 132.

An output terminal of the second operational amplifier 142 is connected with a first terminal of the third resistor 133 and a first terminal of the fourth resistor 134, an inverting input terminal of the second operational amplifier 142 is connected with a second terminal of the fourth resistor 134.

A first terminal of the variable resistor 137 is connected with the second terminal of the second resistor 132, a second terminal of the variable resistor 137 is connected with the second terminal of the fourth resistor 134.

A second terminal of the first resistor 131 forms a first output terminal 151 of the signal amplification circuit 610, and the second terminal of the first resistor 131 is also connected with the first terminal of the fifth resistor 135, and a second terminal of the fifth resistor 135 is connected with a ground wire.

A second terminal of the third resistor 133 forms a second output terminal 152 of the signal amplification circuit 610, the second terminal of the third resistor 133 is also connected with a first terminal of the sixth resistor 136.

A non-inverting input terminal of the third operational amplifier 143 is connected with the first output terminal 151 of the signal amplification circuit 610, an inverting input terminal of the third operational amplifier 143 is connected with the second output terminal 152 of the signal amplification circuit 610, an output terminal of the third operational amplifier 143 is connected with a third output terminal 153 of the signal amplification circuit 610.

For the signal amplification circuit 610, $$U1-U2=(R2+R4+Rw)Uin/Rw;$$

When R5=R6=Rx, R1=R3=Ry, $$Uo=-(Rx/Ry)*(U1-U2)=-(Rx/Ry)*(R2+R3+Rw)*Uin/Rw.$$

When R2=R3=R, $Uo=-Rx/Ry\times(1+2R/Rw)\times Uin$.

U1 and U2 are output voltages of the first output terminal 151 and an output voltage of the second output terminal 152 respectively; R1, R2, R3, R4, R5 and R6 are resistances of the first resistor 131, the second resistor 132, the third resistor 133, the fourth resistor 134, the fifth resistor 135 and the sixth resistor 136. Rw is a resistance of the variable resistor 137; Uin is the input voltage of the input terminal, namely, Uin is the pressure signal of the signal amplification circuit 610 from the pressure sensor 110; Uo is an output voltage of the third output terminal 153.

It can be seen from the above formulas that, when Rx, Ry and R are fixed values and the output voltage Uin of the pressure sensor 110 is a value output based on the pressure, Uo is a function related to Rw, so adjusting Uo may be realized by adjusting Rw. Namely, an amplification factor may be adjusted by adjusting Rw. When Rw is adjusted to a specific value, Uo is a value only related to Uin.

For the signal amplification circuit 610, the first operational amplifier 141 and the second operational amplifier 142 constitute a differential amplifier, which may obtain a larger input impedance and suppress a common mode interference. After an inverting amplification of the third operational amplifier 143, the output voltage may be increased to a volt level.

Obviously, an actual structure of the signal amplification circuit 610 is not limited to this. The signal amplification circuit 610 in the related art and other signal amplification circuits 610 may also be referred to, which may amplify the signal collected by the pressure sensor 110.

Figure 5:
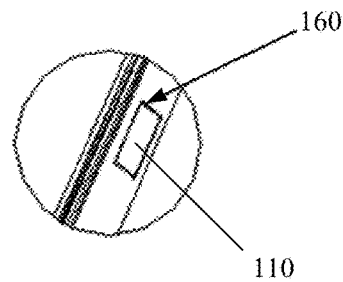
FIG. 5 is a schematic diagram illustrating a structure of a pressure sensor according to some embodiments of the present disclosure.

Optionally, the terminal device further includes a shell, as shown in FIG. 5, a hole 160 through the housing is provided at a side of the housing, and the pressure sensor 110 is accommodated in the hole 160.

In this embodiment, the hole 160 is arranged on the side of the shell to accommodate the pressure sensor 110, which may facilitate an identification of the position of the pressure sensor 110. The user may operate the pressure sensor 110 when touching it, thus improving the convenience of operation. For example, when in danger, the user may realize the alarm by pressing the mobile phone without taking it out, which improves an invisibility of the alarm.

Figure 6:
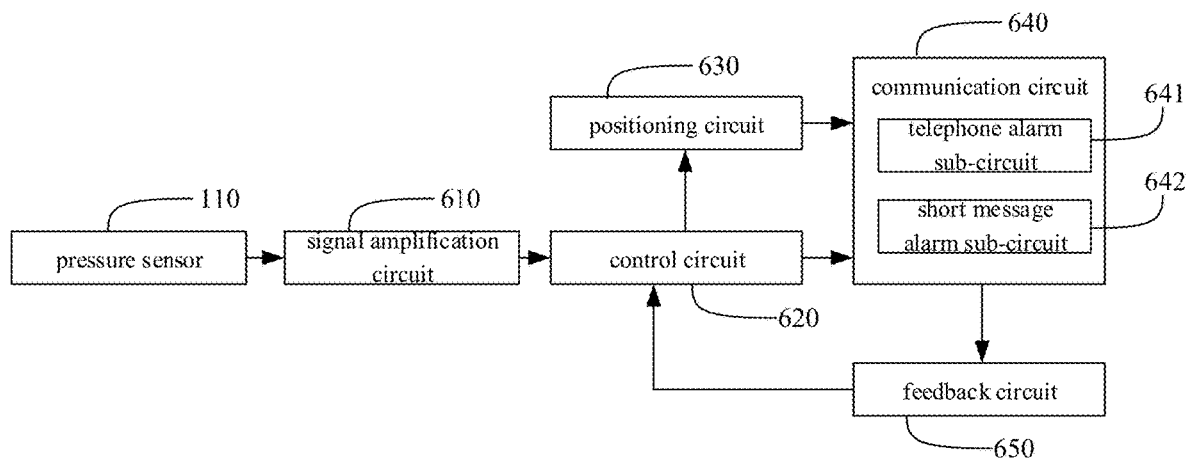
FIG. 6 is a schematic diagram illustrating a structure of a terminal device according to some embodiments of the present disclosure.

As shown in FIG. 6, a working process of the terminal device in the present disclosure may be summarized as follows: when the pressure sensor 110 detects the pressure, and then generates the pressure signal (i.e. the output signal of the pressure sensor), then sends the pressure signal to the signal amplification circuit 610. Then the signal amplification circuit 610 sends the pressure signal after amplifying to the control circuit 620. Finally, the control circuit 620 performs the preset operation.

When the preset operation is sending the alarm message, the control circuit 620 controls the communication circuit 640 to send the alarm message.

Taking sending the alarm signal including dialing the alarm number and sending the alarm message as an example, the communication circuit 640 includes a telephone alarm sub-circuit 641 and a short message alarm sub-circuit 642. The control circuit 620 controls the telephone alarm sub-circuit 641 and the short message alarm sub-circuit 642 to alarm by a call and a short message respectively.

The terminal device further includes the positioning circuit 630. The terminal device may send the position information provided by the positioning circuit 630 while alarming, so as to determine the position of the user.

The terminal device further includes a feedback circuit 650 connected with the communication circuit 640, the feedback circuit 650 may continuously send the alarm signal through the communication circuit 640 when the user is not out of danger and the alarm is not stopped. In a process of sending the alarm signal continuously, the position information of the user may be updated until the user is out of danger, then the alarm will be stopped.

Some embodiments of the present disclosure provide a method for controlling a terminal device, applied to any one of the terminal devices.

Figure 7:
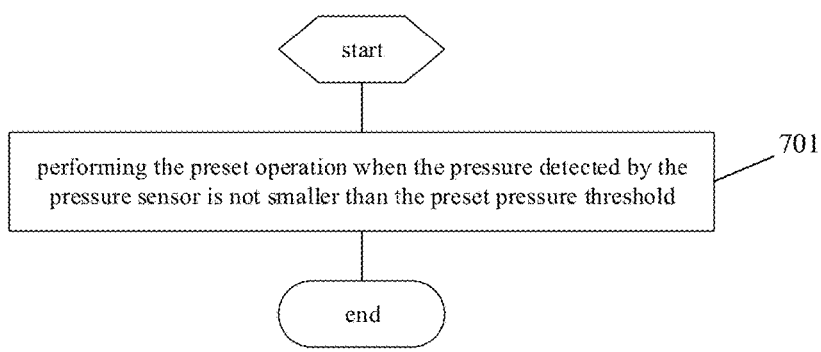
FIG. 7 is a flow chart illustrating a method for controlling a terminal device according to one embodiment of the present disclosure.

As shown in FIG. 7, the method for controlling the terminal device includes following steps:

Step 701: performing, the preset operation when a pressure detected by the pressure sensor is not smaller than the preset pressure threshold.

By setting the pressure sensor and the control circuit, when the pressure sensor detects the pressure, under the circumstance that the corresponding preset operation is already configured, the terminal device of the embodiment may perform the preset operation through the control circuit, which simplifies a control and use process and improves a convenience in the use process.

Optionally, at least two pressure sensors are provided, and at least one pressure sensor is arranged at each one of two sides of the terminal body which are opposed to each other, step 701 includes:

performing the preset operation when the pressure detected by at least one pressure sensor arranged at each one of the two sides of the terminal body which are opposed to each other is not smaller than the preset pressure threshold.

In the above embodiments, the preset operation may be performed only when the pressure detected by at least one pressure sensor arranged at each one of the two sides of the terminal body which are opposed to each other is not smaller than the preset pressure threshold, which may improve an accuracy in practical use and reduce a possibility of the preset operation from triggering by being touched mistakenly.

Optionally, the terminal device includes a communication circuit connected with the control circuit, performing the preset operation, includes:

controlling, by the control circuit, the communication circuit to send the alarm signal, and sending the alarm signal is to dial an alarm number and/or send an alarm message.

The alarm may be realized quickly in some embodiments of the present disclosure. The alarm process is relatively invisible and the operation is relatively simple, so as to avoid the user from operating the terminal device calmly in emergency situations due to nervous and other factors, or from exposing a behavior of the user when operating the terminal device to alarm.

Dialing the alarm number may include dialing an alarm number where the user is located, then the user talking. Dialing the alarm number may also be playing an audio file after dialing the alarm number. The audio file may include prerecorded user information and current position information of the terminal device. The current position information may be obtained by calling positioning software or a positioning circuit, and played in voice. The positioning software may refer to positioning software in the related art, such as map software. The positioning circuit may be a Beidou positioning circuit, a Global Positioning System (GPS) and so on.

Sending the alarm message may include sending the alarm message to an alarm platform by means of a short message or a communication software. The alarm message may also include the user information and current position information. The current position information may be provided by the positioning software or the positioning circuit. More specifically, the alarm message may be provided by text, pictures, etc.

In practical applications, the user may choose to dial the alarm number or send the alarm message, or, dial the alarm number and send the alarm message at the same time, which may both realize the rapid alarm.

Optionally, after controlling, by the control circuit, the communication circuit to send the alarm signal, the method further includes:

sending a vibration prompt signal.

In order to prompt that the alarm is realized successfully, the vibration circuit is further arranged in this embodiment. After the alarm information is sent successfully, the vibration signal is sent to prompt the user that the alarm is realized successfully. The vibration circuit may be realized by setting a vibration motor or using a vibration motor in the terminal device. Compared with voice, ringtone and other signals, the vibration prompt signal indicating that the alarm is realized successfully is more invisible, which is better for protecting the safety of the user in some emergency situations.

Meanwhile, if the alarm signal is indeed caused by being touched mistakenly, the vibration signal may also remind the user that the pressure sensor is touched mistakenly, so that the alarm may be timely discarded.

Optionally, the terminal device further includes a feedback circuit connected with the communication circuit and the control circuit, after controlling, by the control circuit, the communication circuit to send the alarm signal, the method further includes:

controlling, by the feedback circuit, the communication circuit to send the alarm signal continuously when the alarm signal is sent and no input of interrupting the alarm signal is detected.

If an input of interrupting the alarm signal is detected, for example, the user is out of danger or the alarm signal is sent by being touched mistakenly, the alarm signal may be interrupted to avoid wasting social resources. If no input of interrupting the alarm signal is detected, the alarm signal will be sent continuously in order to send a latest status in the alarm message in time, such as updated position change information of the user, which is better for maintaining an information communication and learning about the latest situation of the user.

Figure 8:
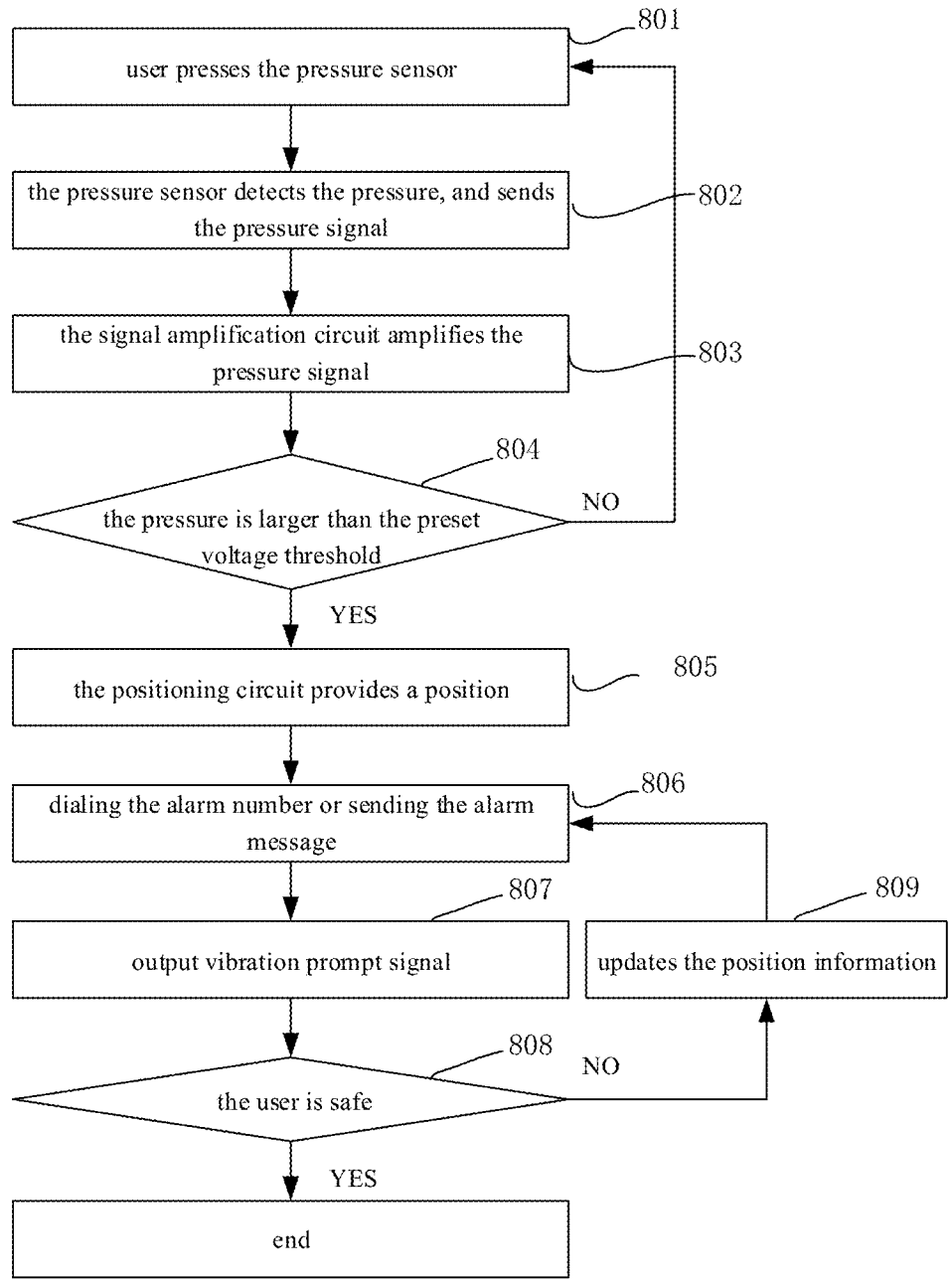
FIG. 8 is a flow chart illustrating a method for controlling a terminal device according to one embodiment of the present disclosure.

As shown in FIG. 8, in the case that performing the preset operation is sending the alarm signal, the method may be summarized as follows: when the user is in danger and need to alarm, the pressure sensor is pressed (step 801). When the pressure sensor detects the pressure, and sends the pressure signal to the signal amplification circuit (step 802). Then the signal amplification circuit amplifies the pressure signal (step 803).

The pressure signal, after amplification, is compared with a preset voltage threshold to determine whether the pressure detected by the pressure sensor is larger than the preset pressure threshold (step 804). When the pressure is larger than the preset voltage threshold, the positioning circuit provides a position (step 805) and sends the alarm signal. Sending the alarm signal includes dialing the alarm number or sending the alarm message (step 806). After the alarm signal is sent successfully, the vibration signal is output (step 807) to prompt the user that the alarm is realized successfully.

Before confirming the user is safe (step 808), the position information is updated continually (step 809) and the alarm signal is sent until the user is safe, then the alarm is stopped.

Optionally, the preset pressure threshold includes at least a first pressure threshold and a second pressure threshold, the first pressure threshold is smaller than the second pressure threshold, the preset operation includes at least a first preset operation and a second preset operation that are different operations.

Step 701, includes:

performing, the first preset operation when the pressure detected by the pressure sensor is not smaller than the first pressure threshold and not larger than the second pressure threshold;

performing, the second preset operation when the pressure detected by the pressure sensor is not smaller than the second pressure threshold.

The abovementioned embodiment is provided to trigger different preset operations according to different pressures. An example is illustrated where the first preset operation is taking a photo, the second preset operation is starting a browser, the first pressure threshold is 200 Newton (N), and the second pressure threshold is 400 N.

When the pressure detected by the pressure sensor is not smaller than 200 N and not larger than 400 N, the photo is taken, and when the pressure detected by the pressure sensor is not smaller than 400 N, the browser is started. Thus, different operations may be triggered according to different pressures.

Obviously, the specific pressure thresholds are not limited to these. The specific pressure thresholds may be determined according to an input. or, pressures of pressing the pressure sensor may be obtained in pre-tests, then corresponding pressure values may be the pressure thresholds. The first preset operation and the second preset operation may be associated with sending the alarm signal, taking the photo, starting or closing an application and other operations.

Optionally, a quantity of the pressure thresholds may also be altered, for example, three pressure thresholds may be set, and different pressure ranges may correspond to different preset operations.

By setting multiple pressure thresholds corresponding to multiple preset operations, different functions of the terminal device may be called conveniently and quickly, which improves the convenience of operation.

Some embodiments of the present disclosure provide a terminal device, including: a memory, a processor, and a computer program being stored in the memory and capable of running on the processor, the processor is configured to execute the computer program, to perform any one of the methods for controlling the terminal device described above.

Some embodiments of the present disclosure provide a computer readable medium, storing a computer program, a processor is configured to execute the computer program, to perform any one of the methods for controlling the terminal device.

The mobile terminal and the computer readable medium may implement various processes of the mobile terminal implemented in the method embodiments, and may achieve at least all the above technical effects, which will not be repeated herein for the sake of simplicity.

The above are merely embodiments of the present disclosure, but a protection scope of the present disclosure is not limited thereto. It should be appreciated that a person skilled in the art may make further modifications and improvements without departing from the spirit of the present disclosure, and these modifications and improvements shall also fall within the scope of the present disclosure. Therefore, the protection scope of the present disclosure shall be subject to the protection scope of the claims.

What is claimed is:

1. A mobile communication terminal, comprising:
a terminal body;
a pressure sensor arranged on at least a side of the terminal body;
a control circuit connected with an output terminal of the pressure sensor, and a communication circuit connected with the control circuit, wherein the control circuit is configured to control the communication circuit to send an alarm signal when a pressure detected by the pressure sensor is not smaller than a preset pressure threshold, said sending the alarm signal comprises dialing an alarm number,
wherein the pressure sensor comprises four strain gauges, which are connected in turn to form a bridge, a connecting terminal is formed between every two connected strain gauges, the bridge comprises a first connecting terminal, a second connecting terminal, a third connecting terminal and a fourth connecting terminal, the first connection terminal and the third connection terminal are connected with two terminals of an excitation power supply respectively, the second connection terminal and the fourth connection terminal are connected with two output terminals of the pressure sensor respectively,
wherein the pressure sensor comprises a substrate and four strain patterns arranged on the substrate, each of the strain patterns forms a strain gauge.

2. The communication terminal according to claim 1, comprising at least two pressure sensors, wherein at least one pressure sensor is arranged at each one of two sides of the terminal body which are opposed to each other.

3. The communication terminal according to claim 2, wherein the control circuit is configured to control the communication circuit to send an alarm signal when the pressure detected by at least one pressure sensor arranged at each one of the two sides of the terminal body which are opposed to each other is not smaller than the preset pressure threshold.

4. The communication terminal according to claim 1, further comprising a feedback circuit connected with the communication circuit and the control circuit, wherein the feedback circuit is configured to control the communication circuit to send the alarm signal continuously when the alarm signal has been sent and no input of an interruption alarm signal has been detected.

5. The communication terminal according to claim 1, further comprising a vibration circuit for sending a vibration prompt signal after the alarm signal has been sent by the communication circuit.

6. The communication terminal according to claim 1, further comprising a signal amplification circuit, wherein an input terminal of the signal amplification circuit is connected with an output terminal of the pressure sensor, and an output terminal of the signal amplification circuit is connected with an input terminal of the control circuit.

7. The communication terminal according to claim 1, further comprising a housing, wherein a hole through the housing is provided at a side of the housing, and the pressure sensor is accommodated in the hole.

8. A method for controlling a communication terminal, applied to the communication terminal according to claim 1, the method comprising:
controlling the communication circuit to send an alarm signal when the pressure detected by the pressure sensor is not smaller than the preset pressure threshold.

9. The method according to claim 8, wherein the communication terminal comprises at least two pressure sensors, and at least one pressure sensor is arranged at each one of two sides of the terminal body which are opposed to each other, said controlling the communication circuit to send an alarm signal when the pressure detected by the pressure sensor is not smaller than the preset pressure threshold comprises:
controlling the communication circuit to send an alarm signal when the pressure detected by at least one pressure sensor arranged at each one of the two sides of the terminal body which are opposed to each other is not smaller than the preset pressure threshold.

10. The method according to claim 8, further comprising unlocking a screen of a mobile phone or starting an application.

11. The method according to claim 10, wherein the communication terminal comprises a communication circuit connected with the control circuit, said controlling the communication circuit to send an alarm signal comprises:
controlling, by the control circuit, the communication circuit to send the alarm signal, said sending the alarm signal comprises dialing an alarm number and/or sending an alarm message.

12. The method according to claim 11, after controlling the communication circuit to send the alarm signal by the control circuit,
further comprising:
sending a vibration prompt signal.

13. The method according to claim 11, wherein the alarm message comprises at least user information and/or position information of the communication terminal.

14. The method according to claim 11, wherein the communication terminal further comprises a feedback circuit connected with the communication circuit and the control circuit, after controlling the communication circuit to send the alarm signal by the control circuit, the method further comprising:

controlling, by the feedback circuit, the communication circuit to send the alarm signal continuously when the alarm signal has been sent and no input of an interruption alarm signal has been detected.

15. The method according to claim 8, wherein the preset pressure threshold comprises at least a first pressure threshold and a second pressure threshold, the first pressure threshold is smaller than the second pressure threshold, said sending the alarm signal comprises at least a first preset operation and a second preset operation which are different operations, said controlling the communication circuit to send an alarm signal when the pressure detected by the pressure sensor is not smaller than the preset pressure threshold comprises:

performing the first preset operation when the pressure detected by the pressure sensor is not smaller than the first pressure threshold and not larger than the second pressure threshold;

performing the second preset operation when the pressure detected by the pressure sensor is not smaller than the second pressure threshold.

16. A communication terminal, comprising: a memory, a processor, and a computer program stored in the memory and capable of being executed by the processor, the processor is configured to execute the computer program to perform the method for controlling the communication terminal according to claim 8.

17. A non-transitory computer readable medium on which is stored a computer program to be executed by a processor to perform the method for controlling the communication terminal according to claim 8.

* * * * *